United States Patent

[11] 3,604,053

| [72] | Inventors | John C. Zemlin<br>Reading;<br>Charles O. Kilham, Beverly, both of, Mass. |
|---|---|---|
| [21] | Appl. No. | 813,815 |
| [22] | Filed | Apr. 3, 1969 |
| [45] | Patented | Sept. 14, 1971 |
| [73] | Assignees | USM Corporation<br>Flemington, N.J.;<br>USM Corporation<br>Boston, Mass. |

[54] SHAPE-FORMING DEVICES
10 Claims, 7 Drawing Figs.

| [52] | U.S. Cl. | 18/4 B,<br>264/316, 18/5 A |
|---|---|---|
| [51] | Int. Cl. | B29c 3/04 |
| [50] | Field of Search | 18/4 B, 4 C,<br>4 R, 4 P, 4 S, 4 V; 264/297, 316 |

[56] References Cited
UNITED STATES PATENTS

| 419,656 | 1/1890 | Gesner | 18/22 X |
|---|---|---|---|
| 2,281,860 | 5/1942 | Renault | 100/154 |
| 3,142,864 | 8/1964 | Pelley | 18/4 |

FOREIGN PATENTS

| 251,627 | 5/1928 | Italy | 18/22 |

Primary Examiner—J. Spencer Overholser
Assistant Examiner—L. R. Frye
Attorneys—W. Bigelow Hall, Richard A. Wise and Aubrey C. Brine ABSTRACT: A machine for the manufacture of relatively thin sheetlike forms from a plastic material. A pair of belts is passed between a pair of mold members while having a charge of plastic material located between the belts to produce a desired form. The molds are brought together with the material and the belts located therebetween, at least one of the belts being employed to carry the material to, and away from, the mold members.

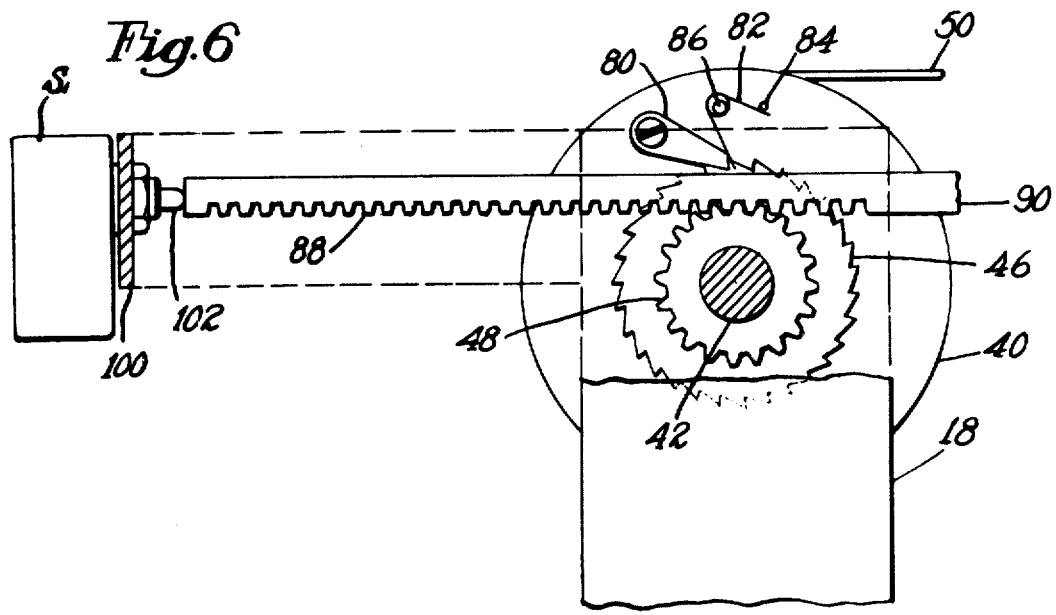
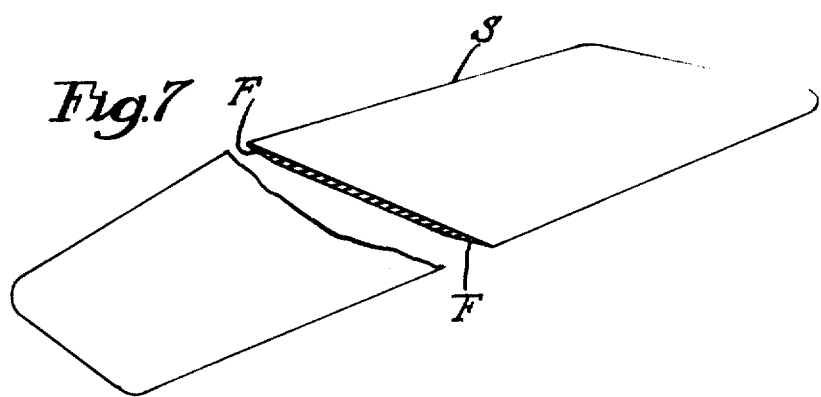

SHAPE-FORMING DEVICES

BACKGROUND OF THE INVENTION

This invention relates to a device for the manufacture of three-dimensional shapes from a plastic material, and more particularly to a machine for manufacturing a relatively thin cross section product for use as a stiffening element in the manufacture of shoes, garments or other products.

In the construction of garments, shoes and instrument cases, as well as in many other fields of manufacture, there often arises the need for a component to be used along with basic material such as leather or fabric, which component produces a stiffening effect in the finished product. The stiffeners as employed in the shoe industry when used in a shoe upper in the vicinity of the heel are generally called counters, but also may be used in a shoe upper on the toe portion to provide a box toe construction. Likewise, in the garment industry, stiffener shapes of relatively thin cross section are found useful in the manufacture of fabric items to provide a stiffness in the desired portion of a hat, shirt, coat or other product.

While various leather or fiber forms have been used in the past to stiffen the above-mentioned products, with the advent of present day chemical technology there have been found a number of plastic resins, both thermal setting and thermal reactive, which may be employed to produce a relatively thin, pliable, stiffener of the type desirable in these products.

A stiffener material and process useful for the above is described in copending patent application Ser. No. 787,175, filed Dec. 26, 1968 in the name of J. C. Zemlin and assigned to the assignee of the present invention. Additionally, a method which may be practiced in the present device is set forth in copending application Ser. No. 813,816 filed Apr. 3, 1969, and assigned to the same assignee as the present invention.

While the present invention is not to be construed as limited to a thermal-setting resin, when thermal-setting resins are employed together with mass production techniques, it is of the utmost importance that rapid heating and cooling of the material be accomplished in order to produce a large quantity of the thin shapes in the least amount of time.

Likewise, while the present invention is not limited to a device for the manufacture of stiffener shapes to be employed in shoes or to be embodied between plies of leather or fabric material, when the forms produced are to be used in this manner it is an important feature of the shape that a feathered edge be provided such that the stiffened portion is not exaggerated by a bulge produced at the edge of the stiffener when embodied between the plies.

SUMMARY OF THE INVENTION

It is therefore an object of the present invention to provide a device for the manufacture of three-dimensional shapes from a plastic material, which device is simple in construction and in its operation is readily adaptable to mass production techniques.

A further object of the present invention is to provide a device for manufacture of three-dimensional shapes of relatively thin cross section from a plastic, which shapes are suitable for use as stiffeners wherein a feathered edge is desired, and without necessitating subsequent trimming of the shape.

Another object of the present invention is to provide a device for the manufacture of three-dimensional shapes from a thermal-setting material wherein rapid heating and cooling of the material is accomplished in the device.

These objects, and other objects which will become apparent as the description proceeds, are accomplished by providing a machine having such forming means as a pair of mating die members at least one of which is a female die having the specific shape of the product to be made therein. The other die member may be of female or male die form, or merely a planar surface, whichever is effective to produce the desired shape. In addition, one of the die forms may be of resilient material and so constructed as to produce a desired feather edge when employed with the cooperating die member.

A pair of conveyor belts is located such that a reach of each of the belts lies substantially parallel and in closely spaced relation one to the other to form a combined reach disposed between the two mating die members. When the die members are in their closed position, the belts are pressed together therebetween.

In operation, a measured quantity of the raw material to be formed is deposited on one of the belts of the work-transferring means and the belt is moved to a position wherein the material is located between the two aforementioned parallel belts along the parallel reach of the belts. Operation of the conveyor belt moves the material to a position between the mating dies, and with the dies in the closed position, portions of the belts in effect serve as a liner for the dies while the material is being formed into the finished product. With the dies drawn apart, the portions of the transfer means are advanced to a new position to remove the finished product from the dies while retained between the belts.

When a thermal-setting material is employed in the manufacture of the form, heat is generally applied at the die members, and a cooling means is provided downstream of the die members and adjacent to the path of the belts. In operation the material is moved from the point of deposit to the position between the heated die members as above, and then to the position remote from the die members where a cooling medium may be applied with the product held between the belts.

Thus, while prior art forming in heated molds generally requires that the material be left in the molds while the large mass of the molds and material is cooled, such time-consuming procedure is advantageously avoided by employing the present invention. The thin form produced in the relatively massive molds is removed from the molds while retained between the belts, which themselves have a small mass, to provide rapid cooling of the combination. In effect the product, as removed from the molds and retained between the belts, may be cooled rapidly after being subjected to rapid heating in the molds, by virtue of the small mass of the belts.

BRIEF DESCRIPTION OF THE DRAWINGS

The above and other objects and features of the invention will appear in the following detailed description of a preferred embodiment of the invention which is illustrated in the accompanying drawings and will be pointed out in the claims.

In the drawings,

FIG. 6 is a view taken substantially on line VI—VI of FIG. 2 showing details of driving elements of the machine, taken on an enlarged scale for clarity; and FIG. 7 is a view in perspective having portions deleted and showing on an enlarged scale details of a product manufactured by the machine.

DESCRIPTION OF THE PREFERRED EMBODIMENT

Figure 1:
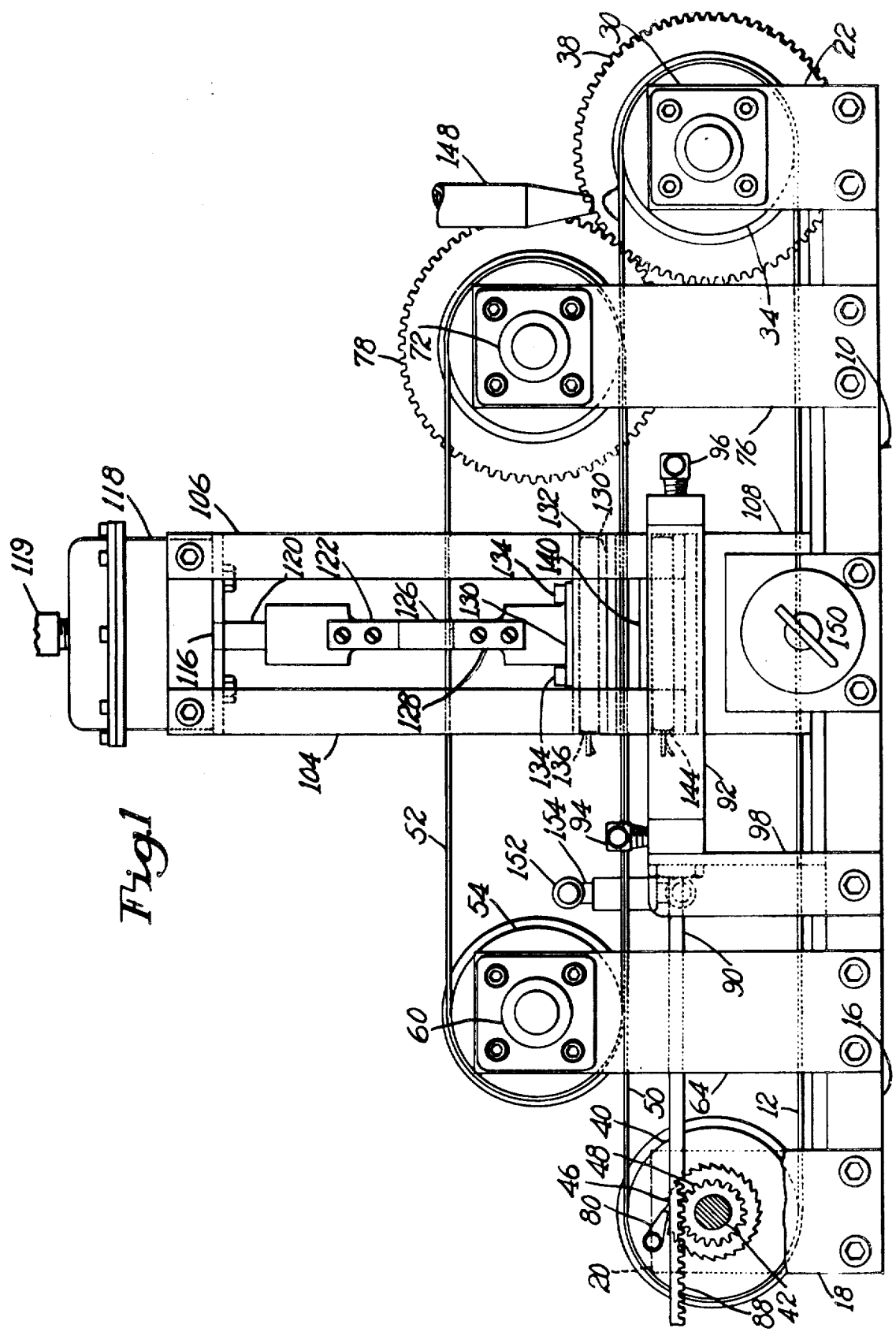
FIG. 1 is a side elevational view showing a machine embodying the features of the invention.
Figure 2:
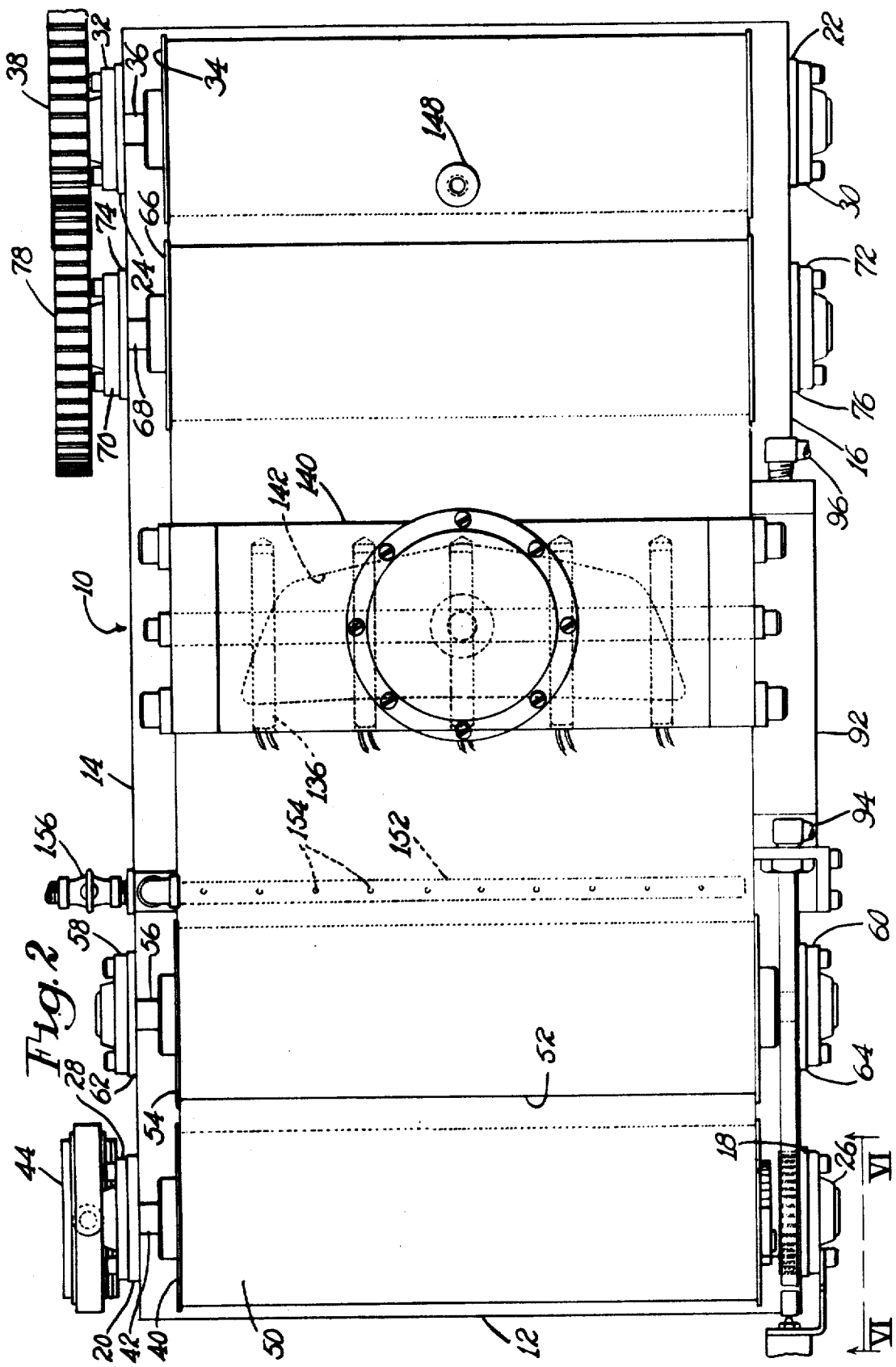
FIG. 2 is a top plan view of the machine of FIG. 1 showing details of the machine elements.
Figure 3:
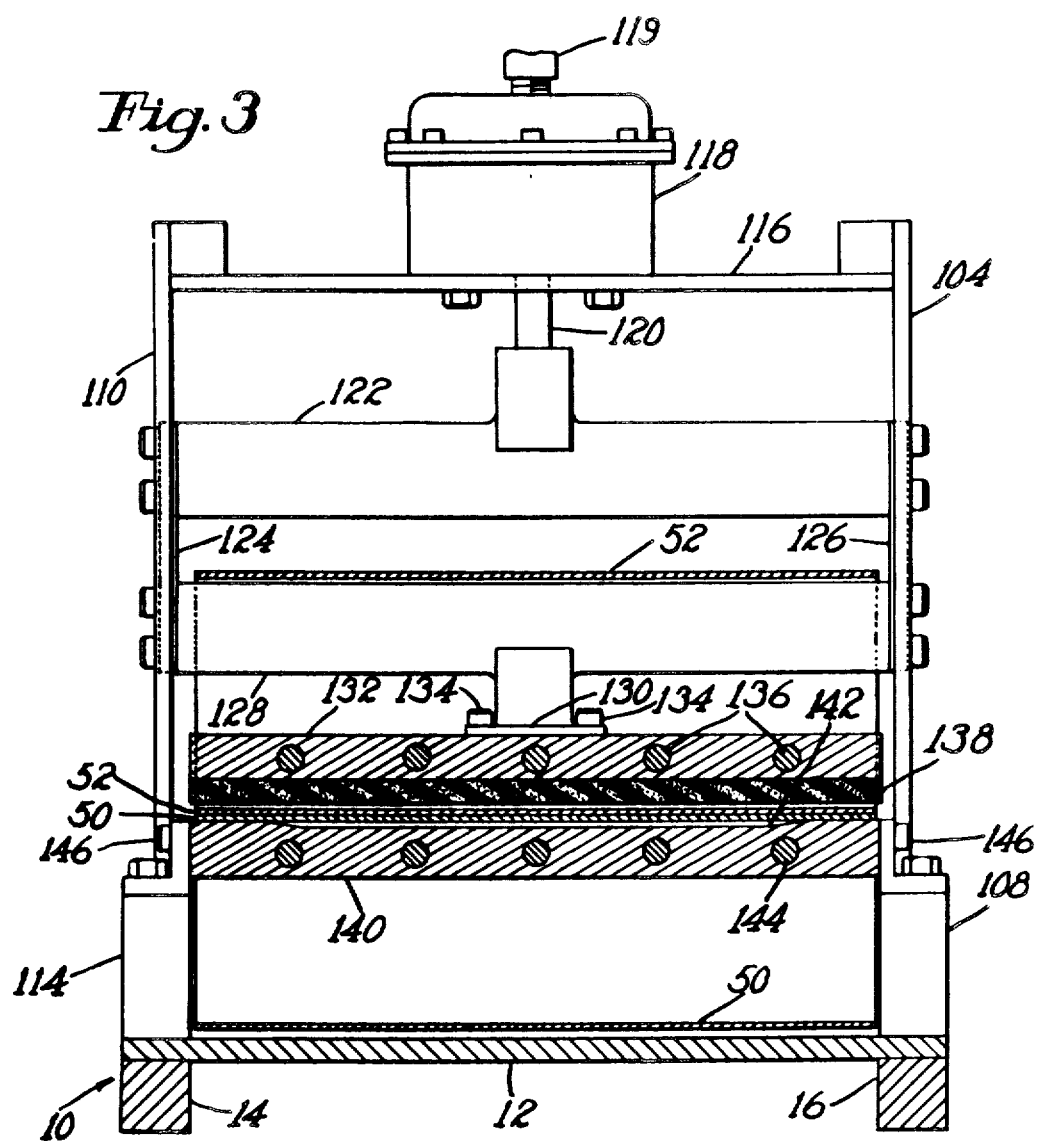
FIG. 3 is a front elevational view of the machine of FIG. 1, partially in section, and showing further details of the various elements of the machine.
Figure 4:
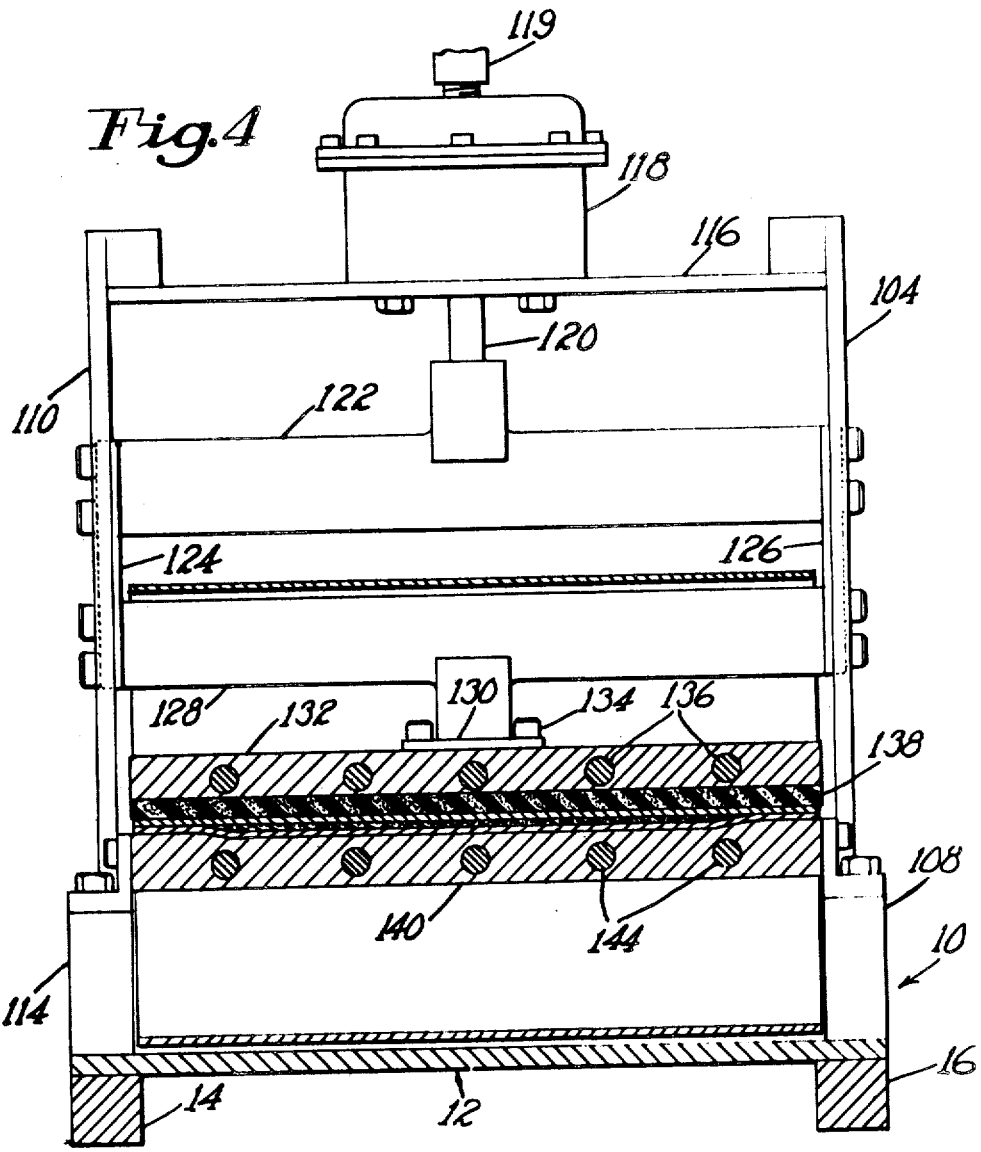
FIG. 4 is a front elevational view similar to FIG. 3, partially in section, and showing various movable elements of the machine as positioned during the machine operation.

Referring now to the drawings and in particular FIGS. 1, 2 and 3, there is shown a machine for the manufacture of three-dimensional shapes from a thermal-setting resin, which machine is constructed in accordance with the teachings of the present invention, and includes a frame 10 having a baseplate 12 mounted on a pair of elongated feet 14 and 16. At the forward end of the frame 10 a pair of upright members 18 and 20 are mounted on opposite sides of the frame by suitable fastener means. In like manner, a pair of upright members 22 and 24 are mounted at the rear of the frame 10 and on opposite sides of the frame. Each of the upright members 18, 20, 22 and 24 is provided at its upper end with a bearing housing 26, 28, 30 and 32, respectively, aligned with the circular opening formed in the respective upright member.

As is best shown in FIG. 2 a roller 34 is fixedly mounted on a shaft 36 which is rotatably received in the bearing housings 30 and 32, and a portion of the shaft extends through the latter housing and has fixed thereto a gear member 38.

At the forward end of the machine a roller 40 is fixedly mounted to a shaft 42 which is rotatably received in the bearing housings 26 and 28. The shaft 42 extends through the bearing housing 28 and into a friction brake assembly 44 (FIG. 2) mounted on the housing. The assembly 44 generally comprises a brakeshoe (not shown) in continuous frictional engagement with the shaft 42, which engagement is adjustable to prevent undue overtravel of the shaft when the drive provided by a shaft rotating means is terminated.

At the opposite end of the shaft 42 there is rotatably mounted a gear assembly including a ratchet gear 46 (FIGS. 1,6) and pinion gear 48 located inboard of the upright member 18. As best shown in FIG. 2 the shaft 42 extends beyond the gears 46 and 48 and is supported in the bearing housing 26.

An endless belt 50 is operatively mounted on the rollers 34 and 40, and tensioned such that movement of one roller is effective to rotate the other roller through the belt drive. In the embodiment shown, the belt 50 is manufactured of a relatively nonstick material such as Teflon-coated fiber glass, and the rollers 34 and 40 are generally provided with a roughened or otherwise adherent outer surface to provide adequate driving contact with the belt surface presented to them.

Adjacent the upper reach of the belt 50 there is located a second endless belt 52 disposed in closely spaced relation, and having a common parallel reach with the belt 50. The belt 52 is mounted at its forward end on a roller 54 having a shaft 56 rotatably received in a pair of bearing housings 58 and 60. The bearing housing 58 is attached to an upright member 64, each member being attached to the frame 10 at its lower end.

At the rear of the machine, the belt 52 is drivingly engaged by a roller 66 mounted on a shaft 68. The shaft 68 is rotatably supported by a pair of bearings located in housings 70 and 72 which are mounted on a pair of upright support members 74 and 76 respectively. The support members 74 and 76 are attached to the base 10 at their lower ends. It will be observed that the shaft 68 extends through the bearing housing 70 and has affixed to the end thereof a gear member 78 (FIGS. 1, 2) in meshing engagement with the gear 38. The belt 52, is generally of the same material as the belt 50 and is tensioned between the two rollers 54 and 66 such that movement of the one roller is effective to cause rotation of the other roller through frictional engagement with the belt. The rollers 54 and 66 are therefore, generally constructed with a roughened or otherwise adherent surface, as provided on rollers 34 and 40.

Referring now to FIG. 6 taken in conjunction with FIGS. 1 through 3, there is shown in detail a drive means effective to cause stepped movement of the belts 52 and 50 in the machine operation. As shown in FIG. 6, a pawl 80 is pivotally attached to the roller 40 and biased toward the ratchet gear 46 by a spring 82 mounted between a pin 84 and a pin 86. A plurality of rack teeth 88 are formed near one end of a piston rod 90, and are engaged with the pinion gear 48 to provide rotation of the gear through movement of the rod.

As shown in FIG. 1, the piston rod 90 is operated by a pneumatic cylinder 92 of the double-acting type having a pair of inlets 94 and 96 located at opposite ends thereof. The cylinder 92 is mounted on a bracket 98 which is affixed to the base 10 at its lower end. Referring again to FIG. 6, an angle bracket 100 is mounted to the upright member 18 and supports a switch S1 having its operating button 102 located in alignment with the forward end of the piston 90.

The belts 50 and 52 are moved in synchronous stepped sequence as next explained. The inlet 94 of the cylinder 92 is pressurized to cause the piston rod 90 to move rearwardly rotating both the ratchet gear 46 and the pinion gear 48 on the shaft 42, with no resultant movement of the roller 40. When the piston bottoms out in the cylinder 92, the pressure is shifted from the inlet 94 and applied to the inlet 96 causing the piston rod 90 to move forwardly thereby moving the gears 46 and 48 in the counterclockwise direction as viewed in FIG. 6. The pawl 80 now catches in the teeth of the ratchet gear 46 and rotation of the rollers 40 and 34 takes place. The rod 90 moves to the left until the button 102 is contacted thereby to operate the switch S1, the belts 50 and 52 being moved simultaneously through their connecting gears 38 and 78.

Referring now to FIGS. 1 through 3, it will be observed that a pair of vertical supports 104, 106 are mounted on a spacer block 108 at one side of the frame 10, and a pair of vertical supports 110, 112 are mounted on a spacer block 114 at the opposite side of the frame. A support plate 116 is connected at the upper ends of the vertical supports 104, 106, 110, 112 the support plate and vertical supports being arranged transversely to span the belts 50 and 52. A pneumatic cylinder 118 having a pressure inlet 119 is mounted on the upper surface of the support plate 116 and an opening is provided in the plate through which a vertical piston rod 120 extends, the rod being operatively connected to a piston (not shown) in the cylinder. The lower end of the piston rod 120 is affixed to an upper crossmember 122 which is in turn connected through opposed sideplates 124 and 126 to a lower crossmember 128. The lower crossmember 128 is provided with a downwardly extending flange 130 to which the upper portion of the forming means, die member 132, is removably attached by fasteners 134. The die member 132 is formed of a substantially rectangular-shaped metallic plate having a plurality of induction heating elements 136 embedded therein, and includes a pad 138 of resilient material, such as rubber or the like.

Directly below the upper die member 132, a female die member 140 is located, having a cavity 142 formed in the surface facing the upper die member. The lower die member 140 is also provided with a plurality of induction heaters 144 and is affixed to the frame 10 by fasteners 146.

It will be noted at this point, that the upper crossmember 122 and lower crossmember 128 are in spanning relation to the upper reach of the belt 52 which is located therebetween, and the upper die member 132 and the lower die member 140 are in spanning relation to the parallel adjacent reaches of the belts 50, 52 which are located therebetween. Thus, pressurizing the cylinder 118 through the inlet 119 is effective to cause movement of the piston rod 120 downwardly and thereby move the crossmembers 122, 128 and the upper die 132 downwardly to position the die members 132 and 140 in clamping relation about contiguous portions of the belts 50 and 52, without disturbing the upper throw of the belt 52.

In operation, a suitable mixer and dispenser arrangement (not shown) having a nozzle 148 (FIG. 1) located adjacent the rearward portion of the belt 50 is provided for delivering thereto the component material to be used in producing a thin cross section three-dimensional form.

Pressure is released from the inlet 119 of the cylinder 118 when allowing the piston rod 120, which is biased upwardly, to move the die members 132 and 140 apart. During upward movement of the upper die member 132, the forward end of the cylinder 92 is pressurized through inlet 94 causing the rod 90 and the rack teeth 88 to be moved rearwardly, the belts 50, 52 remaining stationary. With both the rod 90 and the rod 120 in their respective retracted positions, pressure is relieved at the inlet 94 and applied at the inlet 96 of the cylinder 92 to move the piston rod 90 to its forward position where it contacts the button 102 of the switch S1. Movement of the rod 90 in the forward direction causes the belts 50, 52 to travel through an incremental step by operation of the structure as described hereinbefore, the belt 50 conveying the component material into juxtaposition with the cavity 142. When switch S1 is contacted, pressure is relieved at the inlet 96 of the cylinder 92 and applied to the inlet 119 of the cylinder 118 to bring the upper die member 132 into clamping engagement with the lower die member 140 (and with the material to be formed), and a timer 150 (see FIG. 1) controlling the duration of molding is commenced operating. When the timer 150 has run out, the machine cycle resumes with release of the pressure to inlet 119 permitting separation of the dies. With the depositing of a new shot of component material from the nozzle 148 onto the belt 50, the cycle starts anew.

With each stepped movement of the belts 50 and 52, the material is brought from the point of deposit to a position between the forming means, and then to a position forward of the forming means while retained between the belts. A cooling means in the form of an elongated chamber 152 (FIGS. 1, 2) having a plurality of openings 154 provided therein is located above the parallel contiguous portions of the belts 50, 52 near the path of a product to be removed from the forming means by the next stepped movement of the belts. A valve 156 (FIG. 2) is provided for adjustment of the cold airflow into the chamber 152, and a plurality of jets of cooling air is directed against the belts through the openings 154. Thus, a cooling medium is directed to the product while retained between the belts. The belts, due to their limited mass, absorb little of the cooling medium, and thereby provide for rapid cooling of the product, without disturbing the shape by removal or displacement from between the belts.

Referring to FIG. 7, there is shown a product manufactured employing the female die 140 as shown in the drawings. It will be noted that employing the substantially flat pad 138 in cooperation with the shallow die 140 is effective to produce a feathered edge F on the product S which is desirable in most stiffener applications, as discussed hereinbefore.

Figure 5:
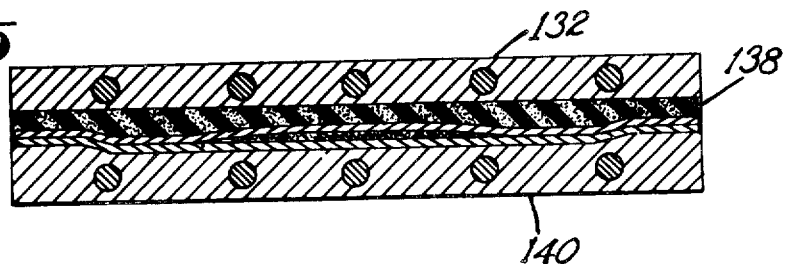
FIG. 5 is a fragmentary elevational view partially in section, similar to a portion of FIG. 4 and showing working elements of the machine during another machine operation.

Referring now to FIG. 5, there is shown a machine operation wherein a product is produced by employing a smaller quantity of component material than required to completely fill the cavity 142 in the female die 140. It is found that by using a resilient pad 138 as the upper die member, the pad deforms somewhat into the cavity, and the resulting product is a stiffener of similar configuration in plan form, but of smaller dimension in plan form and in thickness than the product S obtained when the die cavity 142 is filled. Thus, the same die members 132 and 140 may be employed to produce a number of graded components having similar configuration, but differing in dimensions by changing the quantity of component material introduced into the device.

While the various operating cylinders of the device have been shown as pneumatically operated, it should be understood that a hydraulic system or mechanical system could well be employed without departing from the inventive concept disclosed. Likewise details of the circuitry have not been included in the previous discussion as the various components and circuitry required to interconnect the elements described are well known to one skilled in the art. Moreover, when desired, either or both of the forming dies 132, 140 may be relatively movable into and out of operative positions.

Having thus described our invention, what we claim as new and desire to secure by Letters Patent of the United States is:

1. A device for the manufacture of three dimensional shapes from a plastic material comprising,
   a pair of opposed forming members cooperatively disposed in spaced relation, heating means associated with at least one of said members,
   a pair of movable, parallel-spaced belts for supporting and transferring component material to and from an operating position between said forming members, a reach of said parallel-spaced belts being arranged for movement between said pair of forming members, means for depositing a quantity of component material on said reach at a locality spaced laterally from said forming members, and means for relatively moving said forming members to clamp said parallel-spaced belts and the deposited component material therebetween at said operating position to produce an element of desired shape.

2. A device as set forth in claim 1 wherein each of said belts comprises an endless belt.

3. A device as set forth in claim 1 wherein at least one of said forming members comprises a female die member and further including heating means operatively connected with said die member.

4. A device as set forth in claim 3 wherein said belt is of a relatively nonstick heat resistant material.

5. A device as set forth in claim 1 which further includes means for cooling said belt spaced along the length of said belt and having said forming members located along the length of said belt between said depositing and said cooling means.

6. A device for the manufacture of three-dimensional shapes from a plastic material comprising,
   a pair of opposed forming members cooperatively disposed in spaced relation, heating means associated with at least one of said members, a pair of movable, parallel-spaced belts for supporting therebetween, and transferring, component material during the manufacture process, a reach of said parallel-spaced belts being arranged for movement between said pair of forming members, means for depositing a quantity of component material on a surface of one of said belts facing the other of said belts prior to their entry between said forming members, and means for cooling said material while disposed between said belts located on the opposite side of said forming members from said depositing means.

7. A device according to claim 6 which further includes means for causing intermittent synchronous movement of said belts whereby material deposited on said one belt is moved seriatim from the point of deposit, between said forming means, and to said cooling means.

8. A device according to claim 7 which further includes means to move at least one of said forming members relative to the other to clamp confronting portions of said belts and the material deposited thereon between said members.

9. A device according to claim 8 wherein one of said forming members comprises a female die and the other of said member includes a pad of resilient material having a substantially planar surface.

10. A device according to claim 9 which further includes heating means operatively associated with said forming members to heat material disposed therebetween.